United States Patent [19]

Mototake et al.

[11] Patent Number: 5,126,909
[45] Date of Patent: Jun. 30, 1992

[54] SLIDER LOCK BRAKING MECHANISM FOR SETTING MODES IN TAPE PLAYER

[75] Inventors: Tatsuya Mototake, Kanagawa; Masao Ohyama; Yutaka Fukuyama, both of Tokyo,, all of Japan

[73] Assignee: Sony Corporation, Tokyo, Japan

[21] Appl. No.: 744,702

[22] Filed: Aug. 13, 1991

[30] Foreign Application Priority Data

Sep. 17, 1990 [JP] Japan .................................. 2-246619

[51] Int. Cl.⁵ ........................ G11B 5/027; G11B 5/008
[52] U.S. Cl. ..................................... 360/137; 360/85; 360/95
[58] Field of Search ............................ 360/137, 85, 95

[56] References Cited

U.S. PATENT DOCUMENTS 4,841,391 6/1989 Iwasaki ........................ 360/137 X

*Primary Examiner*—A. J. Heinz
*Attorney, Agent, or Firm*—Lewis H. Eslinger; Jay H. Maioli

[57] ABSTRACT

A slider lock mechanism for locking a slider slidable along a chassis to set a plurality of modes in a tape player comprises a slider drive unit for transmitting a rotational force of a motor to the slider via a plurality of disc gears for moving the slider; spring biasing means for biasing the slider to return when the slider reaches a pressure contact position; and a braking mechanism including an electromagnetic actuator for braking one of the disc gears by energization of the electromagnetic actuator in the pressure contact position.

11 Claims, 12 Drawing Sheets

SLIDER LOCK BRAKING MECHANISM FOR SETTING MODES IN TAPE PLAYER

BACKGROUND OF THE INVENTION

1. Field of the Invention

The present invention relates to a tape player for establishing a plurality of modes such as play and stop modes by moving a slider slidable along a chassis, and in particular to a lock mechanism for a slider for setting the modes.

2. Description of the Prior Art

Tape players have a mode in which one member should be brought into a pressure contact with another member.

For example, a tape loading post for pulling out a tape from a tape cassette to achieve a tape loading is brought into a pressure contact with a positioning block, or a pinch roller is brought into a pressure contact with a capstan so that a tape is pinched therebetween.

A limiter switch is usually used as a pressure contact means if such a pressure contact is necessary. In case of, for example, pressure contact of a pinch roller, a limiter spring is disposed between a movable member moved by a motor and the like and a support member for supporting the pinch roller thereon and spring biasing force is generated in the limiter switch by slightly moving the moving member by the motor even after the pinch roller is brought into a contact with the capstan so that the pressure contact therebetween is continued by the spring biasing force.

If the above-mentioned pressure contact has been achieved, members which are brought into a pressure contact by a biasing force of the limiter spring, for example, the above-mentioned pinch roller and a support member for supporting the same are applied with a reaction force due to the pressure contact, that is, a returning force. Accordingly, in order to keep the pressure contact condition, there is a need to provide the moving member or means for moving the same with some lock means to prevent the movement due to the returning force.

Various means have heretofore been used as such lock means. A worm gear is inserted into a rotation transmission system for transmitting the rotation of a motor to the moving member or, exclusively used electromagnetic actuators are comparatively often used for locking one of members of the transmission system.

The moving member for moving a support member which supports a member which is in a pressure contact with the other member often includes a mode establishing slider, that is, a slider which is rectilinearly slidably supported on a chassis and is moved to a given position to establish a given mode.

A considerable load is imposed upon the slider for moving the members to be in a pressure contact and the support member which supports these members and the transmission system of the slider drive unit for moving the slider under such a pressure contact condition. In a mode for achieving such a pressure contact with the tape, a suitable tension is usually applied to the tape and a strong force is applied to the tape in a depth direction on a position where the tape is pinched between the pinch roller and the capstan. Therefore, it is necessary to eliminate such a pressure contact for preventing components of the mechanism and the tape from being distorted and damaged due to high load imposed for an extended period of time when a power failure occurs in such a mode.

Accordingly, locking by said lock means is automatically released to release the pressure contact condition at least when a power failure occurs in a pressure contact condition.

Since an electromagnetic actuator is deenergized simultaneously with the power failure to release the lock condition in the case where the lock means for keeping the pressure condition includes the electromagnetic actuator, it is an advantage that special means for releasing the lock condition on power failure is not necessary. However, the electromagnetic actuator used as lock means is expensive so that the tape player cost is high.

In the case where a worm gear is used as lock means, rotation of a motor in the drive unit should be reversed for releasing the lock on power failure. It is necessary to additionally provide a capacitor having a comparatively high capacity as a back-up power supply for the reversal rotation. Therefore, this capacitor makes a control circuit more complicated and larger. There is also a problem that the tape player cost is high.

OBJECT AND SUMMARY OF THE INVENTION

It is an object of the present invention to provide a lock mechanism for a slider for setting the modes of a tape player which requires no special member for releasing the lock, which is simple in structure and inexpensive.

In order to a accomplish the above object, the present invention provides a slider lock mechanism for setting the modes of a tape player, comprising: slider means which are slidable along a chassis for establishing a plurality of operation modes depending upon positions set by the slider means; biasing means for biasing said slider means toward a first position; slider driving means for converting a driving force of a motor into a moving force of said slider means via a plurality of rotary gears; and braking means for locking said slider means on a second position against the biasing force of said biasing means by braking at least one of said plurality of rotary gears by energization of electromagnetic actuator means.

DETAILED DESCRIPTION OF PREFERRED EMBODIMENTS

The present invention will be described with reference to drawings showing the details of a mode setting slider lock mechanism in a tape player of the present invention.

In the illustrated embodiment, the present invention is embodied in a mode setting slider lock mechanism in a rotary head type audio tape recorder 1 (hereinafter referred to as "R-DAT").

Figure 1:
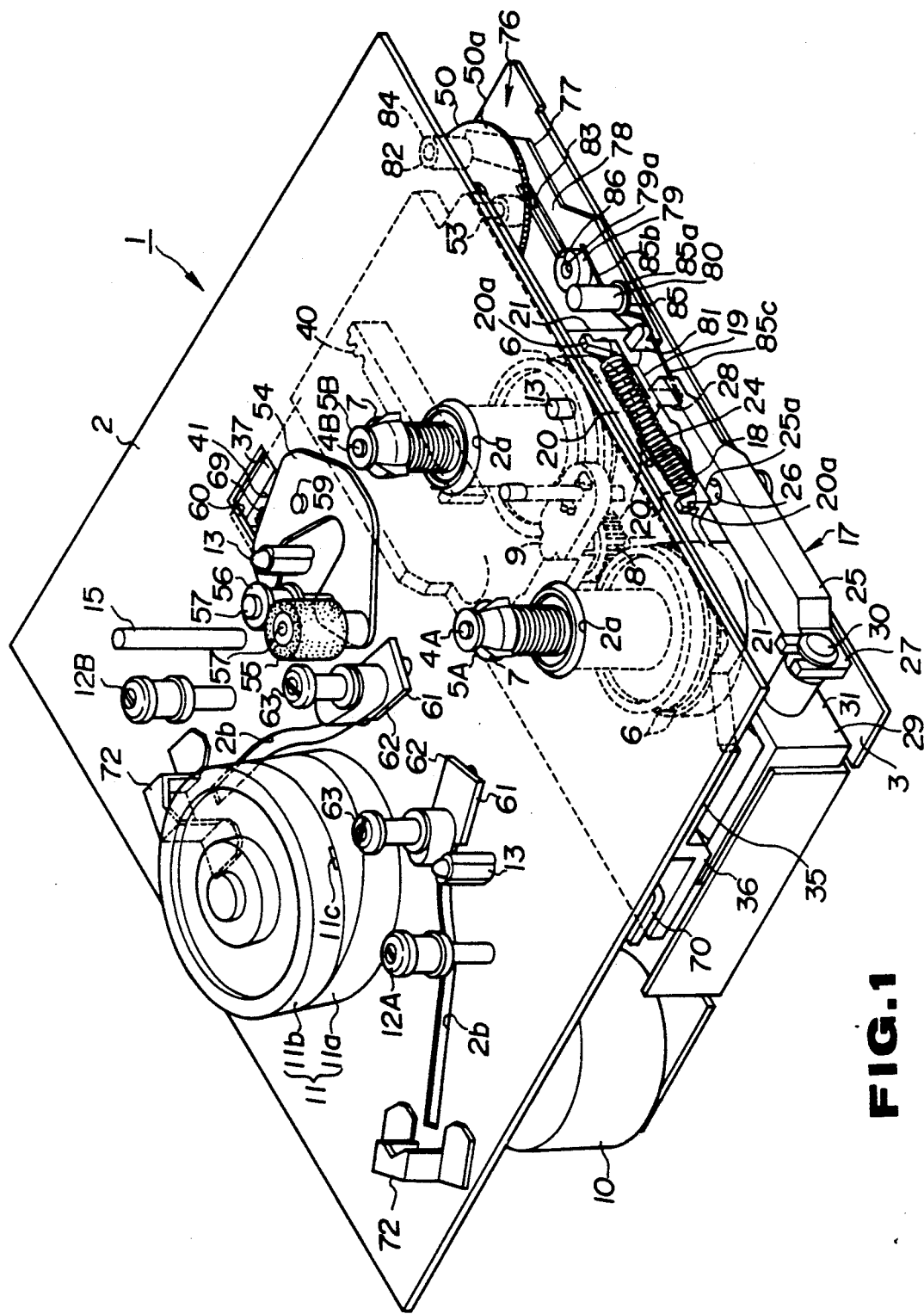
FIG. 1 is a perspective view schematically showing the whole of a rotary head type digital audio tape recorder (R-DAT) including a lock mechanism for a slider for setting the modes in a tape player.
Figure 6:
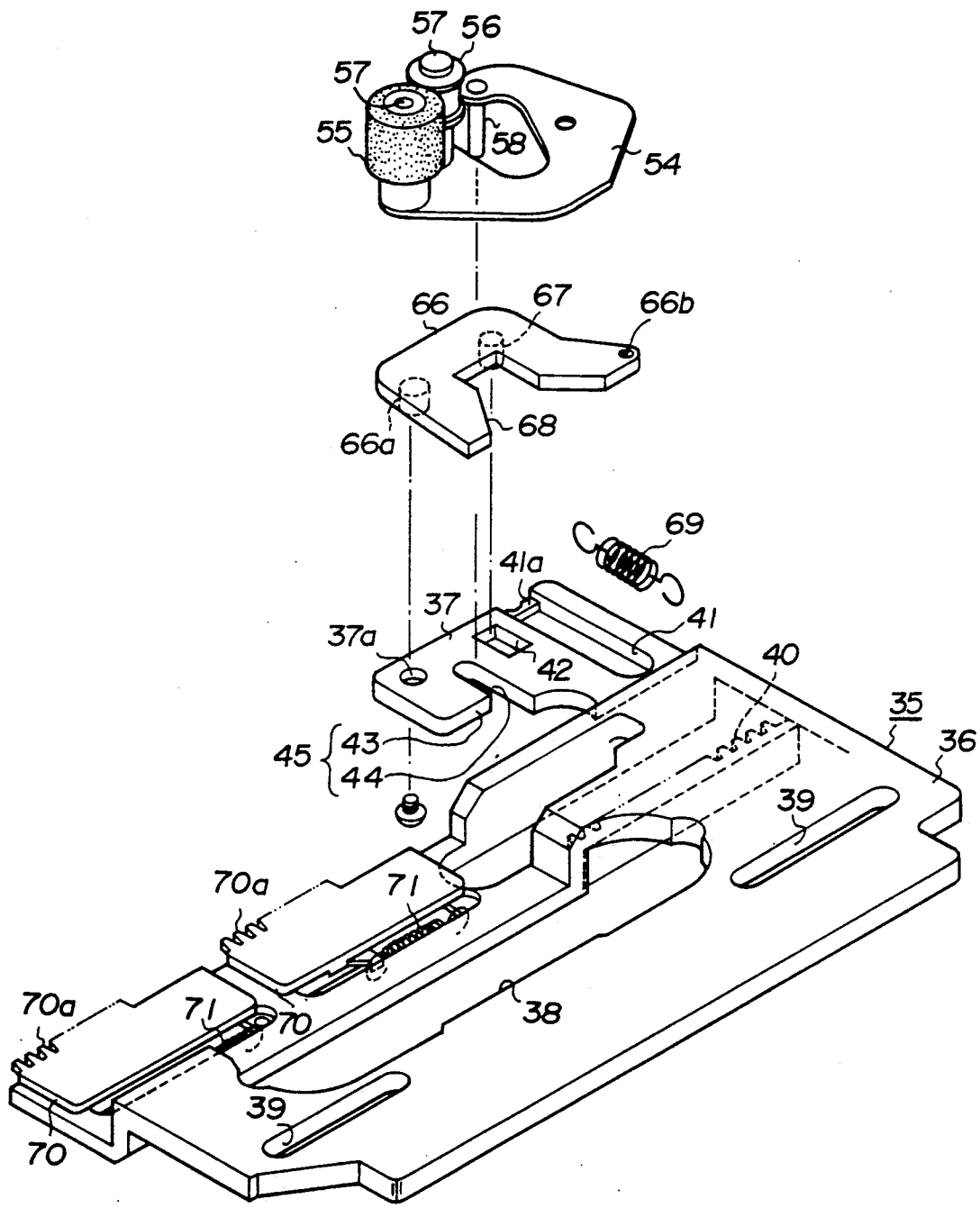
FIG. 6 is an enlarged and exploded perspective view showing a slider, a rotary lever and a pressure contact lever, etc.

The R-DAT 1 includes a sub-chassis 3 disposed in front (the right and lower side of the drawing as viewed in FIG. 1 will referred to as front side. Left and upper, left and lower and right and upper sides of the drawing as viewed in FIG. 6 will be referred to as rear, left and right sides, respectively. Directions are defined based on these positions) of a main chassis 2 and therebelow so that it faces the chassis 2 in a parallel relationship therewith. Two reel drive shaft assembly supporting rods 4A and 4B which are spaced apart from each other in right and left directions are provided on the sub-chassis 3 so that they stand erect therefrom. Reel drive shaft assemblies 5A and 5B are rotatably supported on the reel drive shaft assembly supporting rods 4A and 4B.

Each of the reel drive shaft assemblies 5A and 5B comprises a gear unit 6 having two input gears, which forms the lower end thereof and a reel engagement hub 7 which forms the upper end of the reel drive shaft assembly gear unit 6 and the reel engagement hub 7 are coaxially disposed. The upper portions of the reel drive shaft assemblies 5A and 5B pass through holes 2a and 2a bored in the main chassis 2 and project upward therefrom.

A rocking gear 8 is adapted to rotate the reel drive shaft assemblies 5A and 5B in a tape taking-up direction when it is engaged with either one of the reel drive shaft assemblies 5A and 5B. The rocking gear 8 is rotatably supported by a rocking lever 9 which is supported on the sub-chassis 3 so that the rocking gear is rotatable in substantially right and left directions. The rocking gear 8 is rotated by a reel drive shaft assembly rotating motor 10. When the motor 10 rotates, the rocking lever 9 is rotated in a direction depending upon the rotational direction to bring the rocking gear 8 into an engagement with the gear unit 6 of the left reel drive shaft assembly 5A (hereinafter referred to as "S side reel drive shaft assembly") or the gear unit 6 of the right reel drive shaft assembly 5B (hereinafter referred to as T side reel drive shaft assembly) so that the reel drive shaft assembly 5A or 5B is rotated in a tape take-up direction.

The reel drive shaft assemblies 5A and 5B are rotated at a relatively low speed in a play mode for recording or play back and are rotated at a high speed in a fast running mode for fast forwarding or rewinding of the tape.

A head drum 11 is disposed at the rear end on the upper surface of the main chassis 2 and comprises a fixed drum 11a, a rotary drum 11b which is coaxial with the drum 11a and a rotary magnetic head 11c which is disposed on the outer periphery of a gap between the two drums 11a and 11b and is rotatable together with the rotary drum 11b.

Fixed tape guides 12A and 12B are provided on the main chassis 2 so that the stand erect therefrom. Cassette positioning pins 13 on which a tape cassette 14 (refer to FIG. 2) is disposed are provided on the chassis 2.

Figure 9:
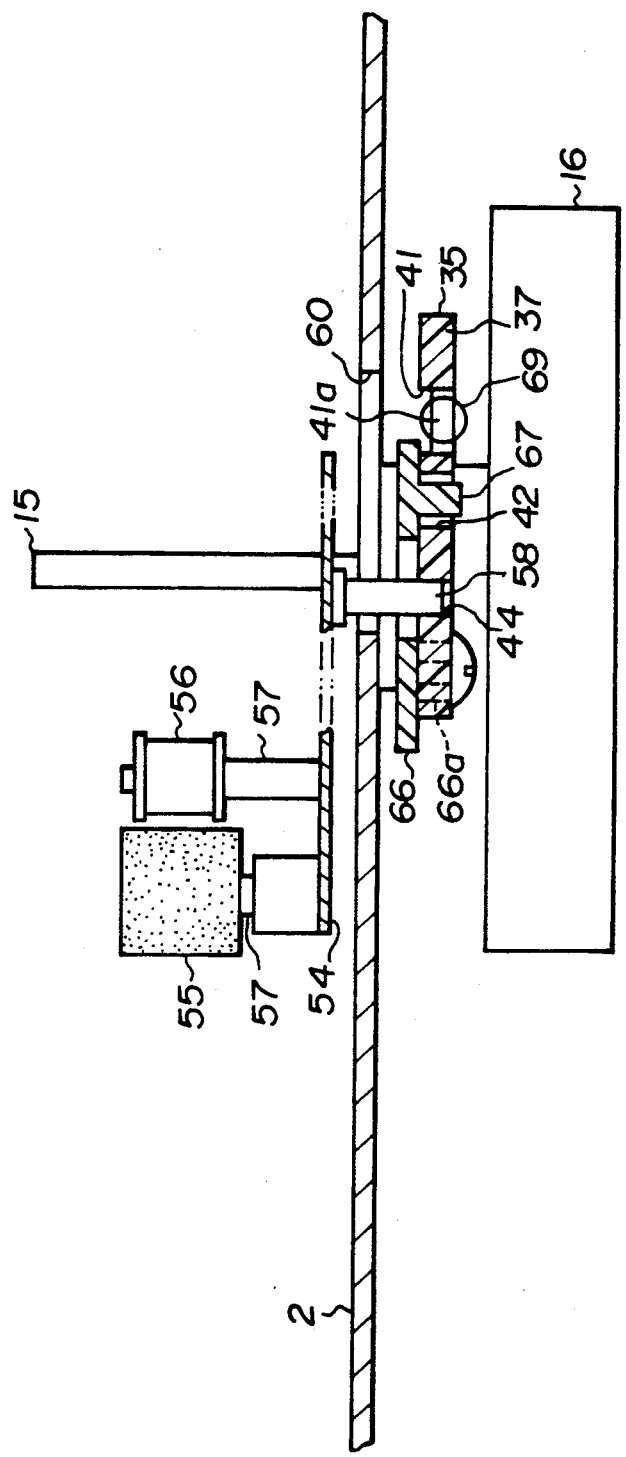
FIG. 9 is a sectional view along the line 1X—1X in FIG. 2.

A capstan 15 is rotatably supported on a capstan housing (not shown) secured to the main chassis 2. The capstan 15 is positioned apart from the right fixed tape guide 12B in a front and slightly right direction as viewed from an upper point and is rotated by a capstan motor 16 (refer to FIG. 9) provided below the main chassis 2.

A brake mechanism 17 is adapted to brake one or both of the reel drive shaft assemblies 5A and 5B in a given mode and comprises two brake levers, one for each of the drive shaft assemblies 5A and 5B and an electromagnetic actuator and a brake release lever, etc.

A brake lever 18 for the S side reel drive shaft assembly (hereinafter referred to as S side brake lever) and a brake lever 19 for the T side reel drive shaft assembly (hereinafter referred to as T side brake lever), each comprises a horizontal flat plate-like main portion 20, a cylindrical portion 21 which is linked to the left or right end of the main portion of the S or T side brake lever 18 or 19 and a brake shoe 22 secured to the central and lower surface of the rear side portion of the main portion 20. The cylindrical portions 21 are supported by support rods 23 erecting from the sub-chassis 3 so that the levers 18 and 19 are swingable in forward and rearward directions on positions substantially front of the reel drive shaft assemblies 5A and 5B. The brake shoes 22 are positioned on substantially the same level as the gear units 6.

A tension spring 24 is tensioned between the spring engagements 20a of the brake lever 18 and 19. The tensioning force of the tension spring 24 applies counterclockwise and clockwise (as viewed from an upper position) rotational forces upon the S and T side brake levers 18 and 19 respectively. When the levers are not biased in directions opposite to the rotational directions, the S and T side brake levers 18 and 19 brake the S and T side reel drive shaft assemblies 5A and 5B by the pressure contact of the brake shoes 22 with the gear units 6 of the S and T side reel drive shaft assemblies 5A and 5B, respectively.

A brake release lever 25 is extended in right and left directions. A support rod 26 erected upon the front end portion of the sub-chassis 3 is inserted into a support hole 25a formed in the middle of the lever 25 so that the lever 25 is rotatable around the rod 26. The lever 25 is formed with an substantially U-shaped link 27 at left end thereof and is formed with a biasing pin 28 extending vertically at the right end thereof.

An electromagnetic actuator 29 is mounted upon the sub-chassis 3 at the left and portion thereof so that the tip end of a piston rod 30 projects forward beyond a shield frame 31. The link 27 of the brake release lever 25 is engaged with a diameter reduced portion 30a formed on the front end of the piston rod 30.

The biasing pin 28 of the brake release lever 25 is loosely fitted at the upper end portion thereof into a hole 32 formed in the main portion 20 of the T side brake lever 19.

When the electromagnetic actuator 29 is energized in a braking position where the levers 18 and 19 are in contact with the reel drive shaft assemblies 5A and 5B, the piston rod 30 is pulled rearward so that the link 27 is urged rearward to rotate the brake release lever 25 in a clockwise direction as viewed from an upper position. Then, the biasing pin 28 of the brake release lever 25 urges the front side edge of the hole 32 of the T side brake lever 19 to rotate the T side brake lever 19 in a counterclockwise direction. The counterclockwise rotation of the lever 19 causes a biasing portion 33 projecting in a left direction from the rear portion of the rotary end of the lever to bias a portion to be biased 34 provided on the rotary end of the S side brake lever 18 and facing the biasing portion 33 of the T side brake lever 19 in a substantially forward direction so that the S side brake lever is rotated in a clockwise direction. This causes the brake shoes 22 of the brake levers 18 and 19 to move to a break release position separated from the gear units 6 of the drive shaft assemblies 5A and 5B (refer to FIG. 11) so that braking of the reel drive shaft assemblies 5A and 5B are released.

Rotation of the reel drive shaft assemblies commences from this condition.

When the electromagnetic actuator 29 is deenergized while the braking of the reel drive shaft assemblies 5A and 5B has been released, the positional restriction on the brake release lever 25 will be released. The brake levers 18 and 19 are thus returned to a braking position by the tension exerted by the tension spring 24.

The S side brake lever 18 is held on the brake release position for a period of time from an initial mode before a tape loading is performed until the tape loading is completed by a mode slider which will be described hereafter. Accordingly, only the T side reel drive assembly 5B is braked for that period of time.

The mode slider 35 is supported on the lower surface of the main chassis 2 so that it is movable in right and left directions and is moved to predetermined positions for moving a loading block, pinch rollers and moving guides to predetermined positions which will be hereinafter described so that various modes are selectively established.

The mode slider 35 comprises a main portion 36 which has a shape which is rectangular and elongated in right and left directions as viewed from an upper position and a control portion 37 which projects rearward from the right end portion of the rear side edge of the main portion 36. The main portion 36 and the control portion 37 are integrally formed of a synthetic resin. The main portion 36 is formed with a relatively large opening 38 which is located in the middle of a width direction (in forward and rearward directions), elongated holes to be guided 39 which are located in the front side edges and are extended in right and left directions, and a rack 40 formed on the lower surface of the main portion, which is located in the right end portion thereof and is extended in right and left directions.

Guide members (not shown) which project toward from the main chassis 2 are slidably engaged with the side edges of the elongated holes to be guided 39 and the opening 39. The mode slider 35 is thus supported on the lower surface of the main chassis 2 so that it is movable in right and left directions over a predetermined range. The intermediate portions of the reel drive shaft assemblies 5A and 5B are inserted through the opening 38.

The control portion 37 is formed into a substantially L-shape as viewed from an upper position and is formed at the right end thereof with a spring arranging hole 41 which is elongated in forward and rearward directions and is formed in the substantially middle of the rear end thereof with a restriction hole 42 which is rectangular and elongated in forward and rearward directions. A front side 43 (hereinafter referred to as holding portion) of a rear half portion is formed into a flat side extending in right and left directions and a cut groove 44 (hereinafter referred to as "biasing portion") which is formed to extend in forward and rearward directions has a front end which opens to the right end of the holding portion 43. The holding portion 43 and the biasing portion 44 from a control cam 45 for performing a position control of a rotary lever which will be described hereafter.

A slider drive unit 46 is provided on the right end of the sub-chassis 3.

A motor 47 is a drive source of the slider drive unit 46 and is secured to the lower surface of the right and rear end of the sub-chassis 3. An output gear 48 in the form of a spur gear which is thick in an axial direction and is secured to a portion of a rotary shaft of the motor 47 projecting upward beyond the sub-chassis 3.

Each of transmission gears 49, 50, 51 and 52 is in the form of a spur gear and comprises a set of two large and small coaxial gears which are integrally formed and is individually and rotatably supported on one of the gear supporting shafts 53 extending upward from the upper surface of the sub-chassis 3.

A larger gear 49a of a first transmission gear 49a of a first transmission gear 49 which is located on the lowermost level is meshed with the output gear 48. A larger gear 50a of a second transmission gear 50 which is located on the second lower level is meshed with a smaller gear 49b of the first transmission gear 49. A larger gear 51a of a third transmission gear 51 which is located on the third lower level is meshed with a smaller gear 50b of a second transmission gear 50. A larger gear 52a of a fourth transmission gear 52 which is located on the uppermost level is meshed with a smaller gear 51b of a third transmission gear 51. A pinion gear which forms a smaller gear of the fourth gear 52 is meshed with a rack 40 of a mode slider 35 from the rear side of the slider 35.

The rotation of the motor 47 is transmitted to the pinion gear 52b after being reduced by a gear train including the output gear 48 and the first to fourth transmission gears 49, 50, 51 and 52. Advancing of the rack 40 by the pinion gear 52b moves the mode slider 35.

Figure 2:
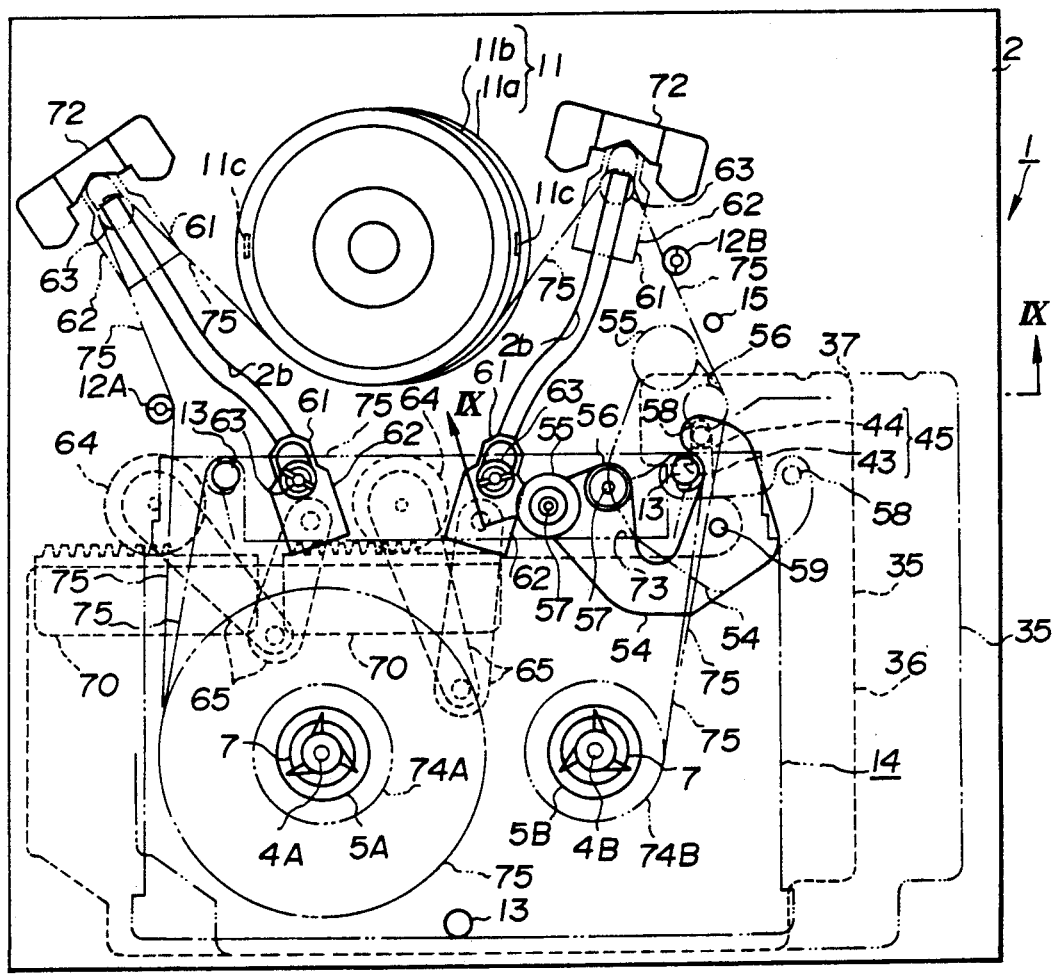
FIG. 2 is a plan view schematically showing the whole of the R-DAT in a limited mode.
Figure 3:
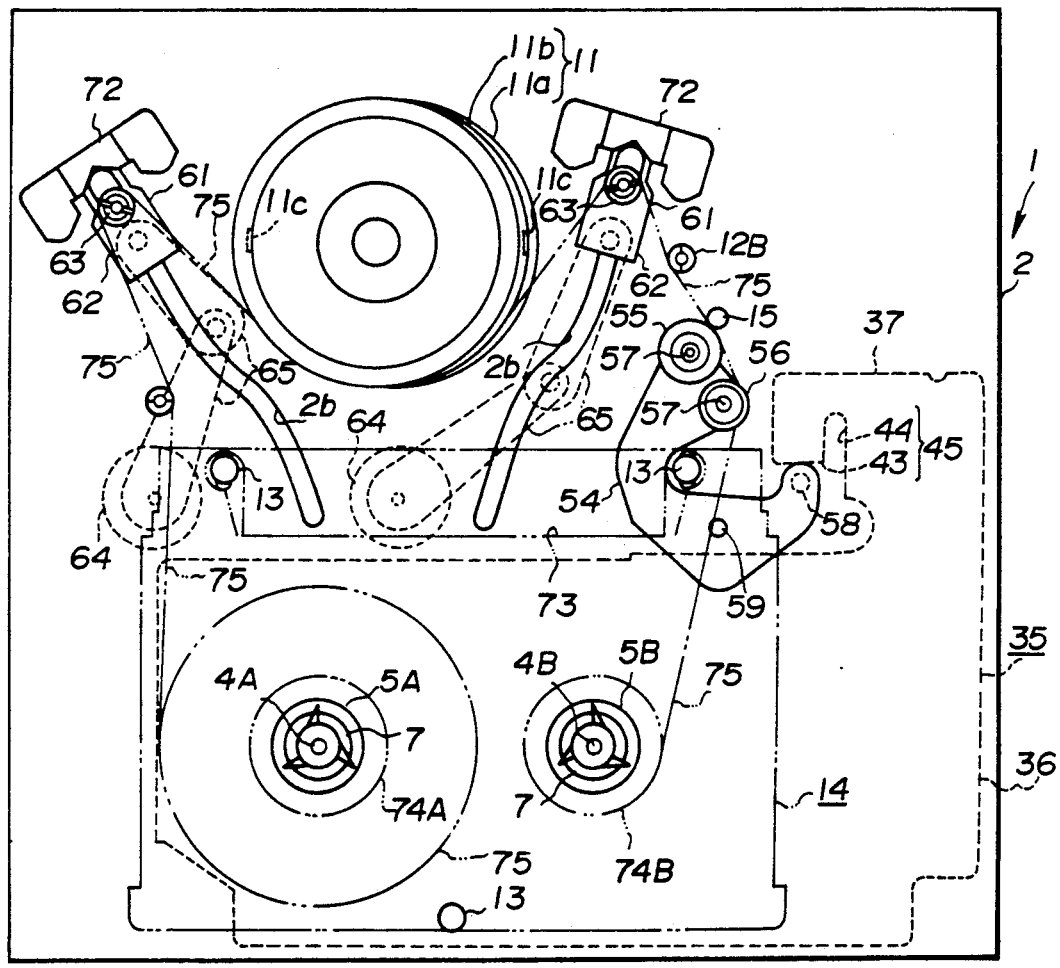
FIG. 3 is a plan view schematically showing the whole of the R-DAT in a play mode.
Figure 4:
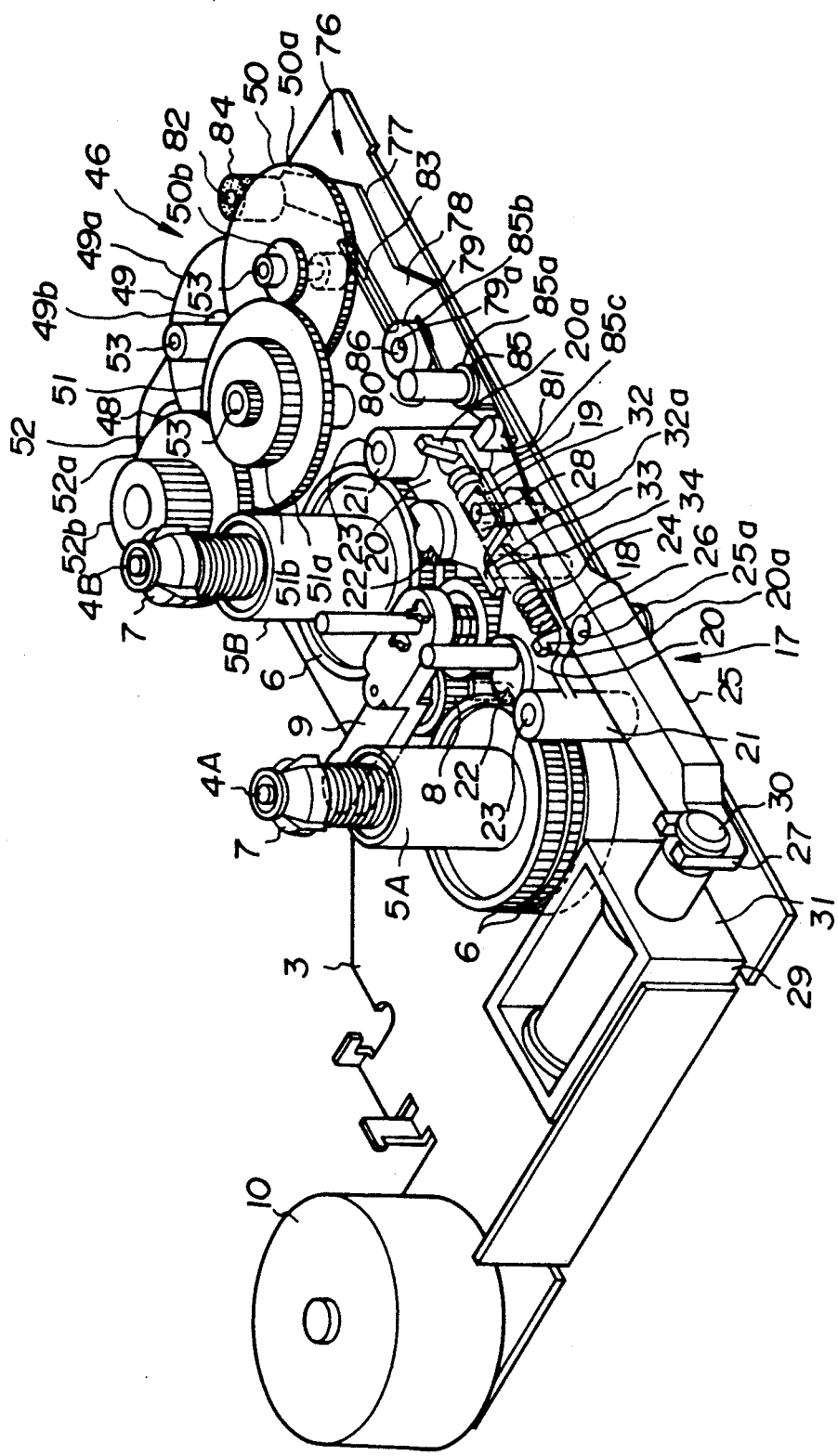
FIG. 4 is a perspective view showing a portion below a main chassis.

The mode slider 35 is moved among a position represented by a dotted line in FIG. 2, that is, an initial position which is a left extremity of the movement range thereof, a position shown in FIG. 3, that is, a play time position which is a right extremity of the movement range thereof and a position represented by a two dot and chain line, that is, a stop time position offset in a slightly left direction from the play time position. A tape loading is achieved by the movement of the mode slider 35 from the initial position to the step time position. A stop mode is established by the movement of the slider 35 to the stop time position.

A rotary lever 54 supports a pinch roller 55 and a movable guide 56. The rotary level 54 is in the form of an inverted V-shaped plate which opens toward the rear side thereof as viewed from an upper position when it is on a position shown in FIG. 10A. The rotary lever 54 widens at the rear end of the left half thereof and is formed with two erecting support shafts 57 which are spaced apart in right and left directions at the rear end of the left half thereof. The pinch roller 55 and the movable guide 56 are rotatably supported by the support shafts 57, respectively. The rear end of the right half of the lever 54 is bent in a left direction and a pin to be biased 58 is suspended therefrom.

The rotary lever 54 is supported on a support shaft 59 projectingly provided on the main chassis 2 in the substantial middle of the right half thereof so that the lever 35 is rotatable in a horizontal direction around the shaft 59. The pin to be biased 58 passes through a hole 60 formed in the main chassis 2 (illustration thereof is omitted in FIGS. 2 and 3) so that most of the pin 58 projects downward beyond the hole 60.

The width of the biasing portion 44 of the control cam 45 is substantially same as the diameter of the pin to be biased 58.

Loading blocks 61 are adapted to perform the tape loading and comprise movable bases 62 and loading posts 63 which stand erect on the movable bases 62. The movable bases 62 are supported on the main chassis 2 so that they are moved along elongated guide grooves 2b formed in the main chassis 2 on the right and left sides of the head drum 11.

Loading gears 64 are rotatably supported on the lower surface of the main chassis 2 and are meshed with a rack of a rack plate supported by the mode slider 35, which will be hereafter described. Loading arms 65 can be extended and retracted by the rotation of the loading gears 64 provided on the base end of the arms 65. The loading arms 64 are rotatably linked with the movable bases 62 of the loading blocks 61 at the tip end thereof.

A pressure contact lever 66 which is supported by the mode slider 35 is adapted to bring the pinch roller 55 into a pressure contact with the capstan 15 in the play mode.

The pressure contact lever 66 is formed into a substantially π-shaped plate which opens forward as viewed from an upper position and is provided with a stopper pin 67 on the lower surface thereof at an corner in which a right side portion is connected to an intermediate portion.

The length of the left side portion in forward and rearward direction is slightly longer than that of the left half of the control portion 39 of the mode slider 35. A front half portion 68 of the right side edge of the left side portion (hereinafter referred to as "biasing portion") is slanted so that it is displaced to the left as it is extended to the front end thereof.

The thus formed pressure contact lever 66 is positioned to overlap the upper surface of the control portion of the mode slider 35. A cylindrical pivot pin 66a suspended from the lower surface of the rear end portion of the left side portion is rotatably inserted into a support hole 37a formed at the left end of the rear end portion of the control portion 37 so that the pressure contact lever 66 is rotatably supported on the mode slider 35. The stopper pin 67 is positioned in the restriction hole 42. Accordingly, the rotation of the pressure contact lever 66 is restricted in a given range of the rotational angle and the counterclockwise rotation of the lever is prevented when the stopper pin 67 is in the standby position in which the pin 67 abuts the rear side edge of the restriction hole 42.

A tension spring 69 is positioned in a spring arrangement hole 41 formed in the control portion 37 and is tensioned between a spring engaging portion 41a positioned at the rear end of the spring arrangement hole 41 of the control portion 37 and a spring engaging hole 66b formed at the front end of the right side portion of the pressure contact lever 66. The pressure contact lever 66 is biased to rotate in a counterclockwise direction as viewed from an upper position by the tension of the tension spring 69 and is normally held on the stand-by position when it is not biased in a clockwise direction.

When the pressure contact lever 66 is in the stand-by position, most of the pressure contact lever 66 excepting the rear end portion of the biasing portion 66 obliquely extends toward the left and front side beyond a position offset to the right end of the holding portion 43.

Figure 10A:
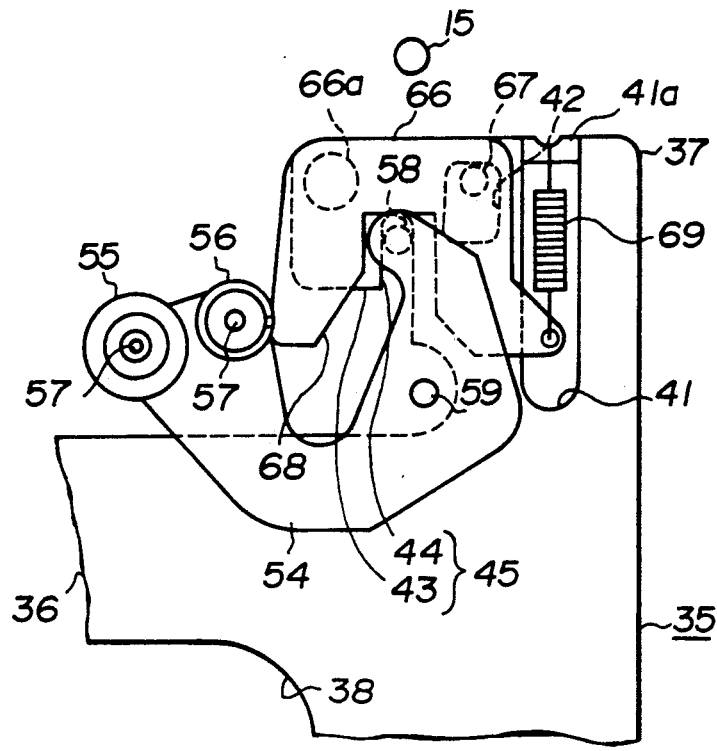
FIGS. 10A, 10B, 10C and 10D are enlarged plan views of the main part of the slider lock mechanism sequentially illustrating the movement of the rotary lever to a given position in response to the movement of the slider and the holding thereof on this position.

When the mode slider 35 is in the initial position, the lower end portion of the pin to be biased 58 of the rotary lever 54 is positioned on the end portion of the biasing portion 44 of the control cam 45 (refer to FIG. 10(A)).

Figure 10B:
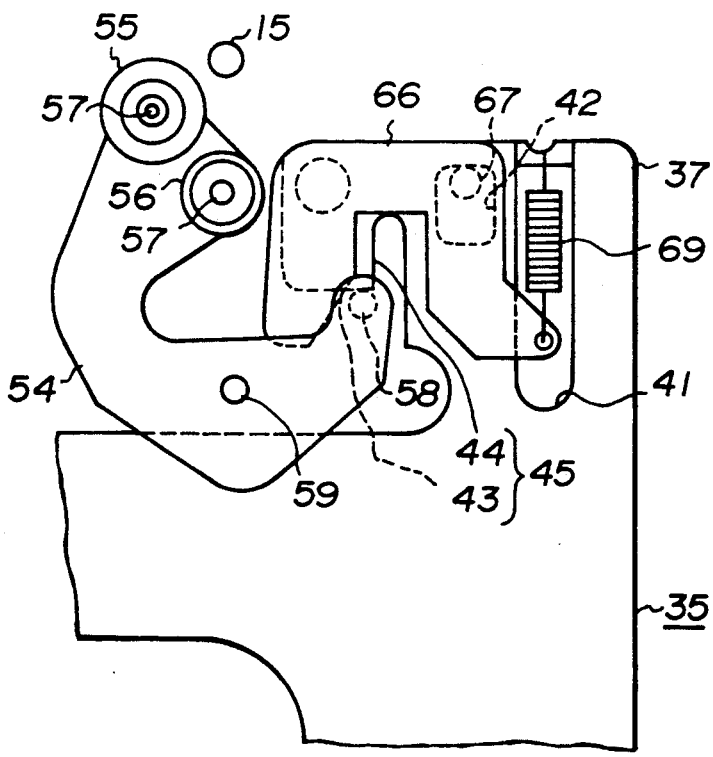
Figure 10C:
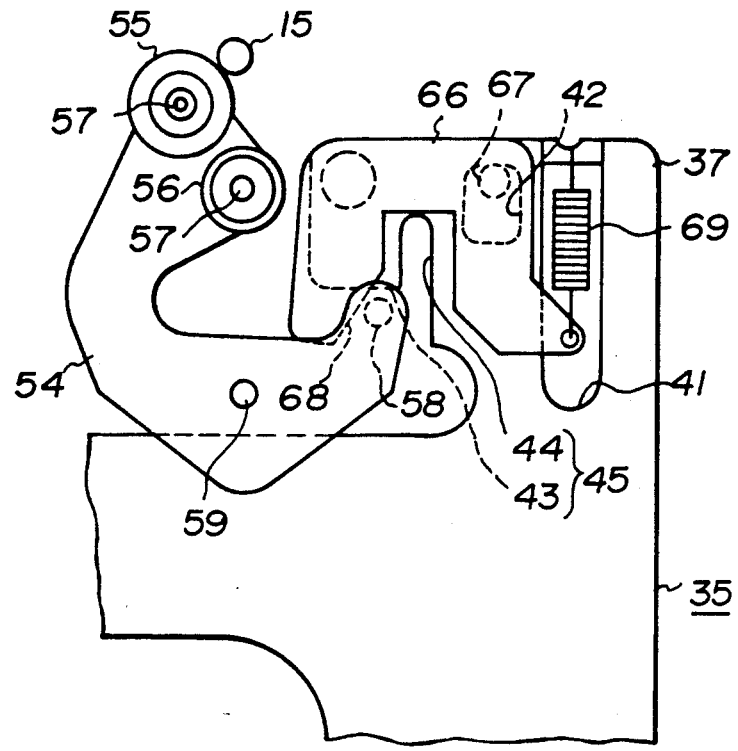
Figure 10D:
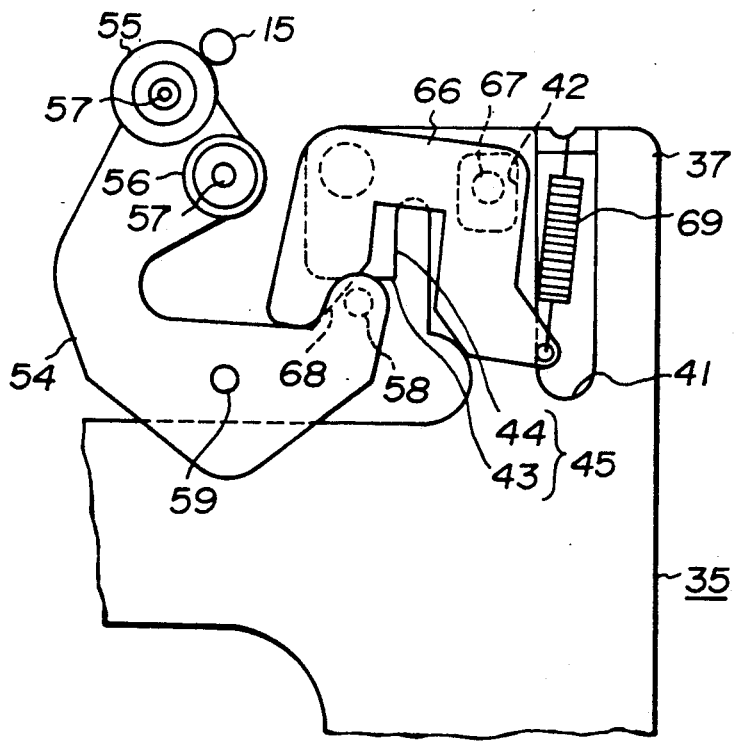

The rotary lever 54 is moved among a first position shown in FIG. 10(A) represented by a solid line in FIG. 2, a second position shown in FIGS. 10(D) and 2, and a third position shown in FIG. 10(B) and represented by a two dot and chain line in FIG. 2.

In other words, when the mode slider 35 is on the initial position, the movement of the pin to be biased 58 is prevented by the biasing portion 44 of the control cam 45 so that the rotary lever 54 is held in the first position. Under this condition, the pinch roller 55 is in the position apart from the capstan 15 by an angle of 90° C. in a counterclockwise direction and the movable guide 56 is positioned on the substantially right side of the pinch roller 55.

When the mode slider 35 is moved in a right direction from this condition, the left side edge of the biasing portion 44 of the control cam 45 biases the pin to be biased 58 in a right direction. The rotary lever 50 is thus rotated in a clockwise direction as viewed from an upper position to move the mode slider 35 to the stop time position. Then, the pin to be biased 58 rides on the right end portion of the holding portion 43 of the control cam 45 as shown in FIG. 10(B). This prevents the rotary lever 54 from being rotated toward the first position. In such manner, the rotary lever 54 is moved to and held in the third position. Under this condition, the pinch roller 55 is positioned substantially in the left and front side of the capstan 15 in the vicinity thereof. The movable guide 56 is positioned somewhat remote from the capstan 15 in a forward direction.

When the mode slider 35 is moved toward the play time position, the biasing portion 68 of the pressure contact lever 66 abuts the pin to be biased 58 immediately after the commencement of the movement for biasing the pin to be biased 58 in a substantially right direction. This causes the rotary lever 54 to be further rotated in a clockwise direction to move to a position near the second position, that is, a position where the pinch roller 55 is brought into a contact with the capstan 15 (refer to FIG. 10(C)). The pressure contact lever 66 is held in the stand-by position by the tension of the tension spring 69 for a period of time until this time. The mode slider 35 is further moved in a right direction from this position to reach the play time position so that the pinch roller 55 is brought into a pressure contact with the capstan 15. In other words, after the rotary lever 54 reaches a position shown in FIG. 10(C)), the rotary lever 54 is prevented from being rotated in a clockwise direction by the abutment of the pinch roller 55 upon the capstan 15. A portion of the biasing portion 68 of the pressure contact lever 66 which is in contact with the pin to be biased 58 is thus prevented from moving in a right direction by the pin to be biased 58. Accordingly, when the mode slider 35 is moved in a right direction under this condition, the pressure contact lever 66 is rotated in a clockwise direction against the tension of the tension spring 69 so that the stopper pin 67 is released from the rear side edge of the restriction hole 42. The tension exerted by the tension spring 69 will act as a force to rotate the rotary lever 54 in a clockwise direction via the pressure contact lever 66. The pinch roller 55 is brought into a pressure contact with the capstan 15 and the positions of the rotary lever 54 and the movable guide 56 are stably held by this tension.

When the mode slider 35 is moved from the play time position to the stop time position, biasing of the pressure contact lever 66 in a relatively clockwise direction which has been performed by the pin to be biased 58 is released. Accordingly, the pressure contact lever 66 is returned to the standby position by the tension of the tension spring 69 and the biasing portion 68 is separated from the pin to be biased 58 in a left direction so that pressure contact of the pinch roller 55 with the capstan 15 is released. When the mode slider has reached at the stop time position, the pin to be biased 58 is brought into contact with the holding portion 43 of the control cam 45 so that the rotary lever 54 is prevented from moving from the third to first position. When the mode slider 35 is moved to the initial position from this condition, the right side edge of the biasing portion 44 of the control cam 45 is brought into an abutment upon the pin to be biased 58 for biasing the pin 58 leftward, thereby to rotate the rotary lever 54 in a counterclockwise direction toward the first position.

Movement of the rotary lever, the pinch roller 55 and the movable guide 56 and holding thereof in predetermined positions and pressure contact of the pinch roller with the capstan 15 is carried out as follows:

Rack plates 70 are supported on the upper surface of the rear end portion of the main portion 36 of the mode slider 35 so that they are movable in right and left directions within a given range. The rack plates 70 are biased to move in a right direction by tension springs 71 (refer to FIG. 6) tensioned between the main portion 36 and the plates 70. When the rack plates 70 are not biased in a left direction, they are held on the right extremity of the range of the movement and moved in an integral manner with the mode slider 35.

Teeth 70a of the rack plates 70 are meshed with the loading gear 64. Accordingly, the loading gear 64 is rotated when the rack plates 70 are moved. This causes the loading arms 65 to be extended or retracted.

When the mode slider 35 is in the initial position, the loading arms 65 are retracted as shown in FIG. 2. This causes loading blocks 61 to be held in the stand-by position represented by a solid line in FIG. 2, that is, a position in which the blocks 61 are juxtaposed with the pinch roller 55 and the movable guide 56.

When the mode slider 35 is moved to the stop time position under this condition, the loading gears 64 are rotated in a counterclockwise direction by rack plates 70 so that the loading arms 65 are extended as shown in FIG. 3. The loading blocks 61 are then moved to a loading completion position in which they abut catches 72 secured to the upper surface of the main chassis 2 as shown in FIG. 2. The rack plates 70 are moved in an integral manner with the mode slider until this time.

When the mode slider 35 is moved toward the play time position from this condition, the rack plates 70 are moved leftward relative to the mode slider 35. That is, since more extension of the loading arms 65 is prevented when the loading blocks 61 abut the catcher 72 the loading gears 64 are prevented from being rotated in a counterclockwise direction and rightward movement of the rack plates 70 meshed with the loading gears 64 is also prevented. The rack plates 70 are thus moved leftward relative to the mode slider 35 so that the tension springs 71 are extended.

Tension of the tension springs 71 will act as a force to bias the loading blocks 61 upon the catchers 72 via the rack plates 70, the loading gears 64 and the loading arms 65 under this condition. This causes the loading blocks 61 to be brought into a pressure contact with the catchers 72.

In the initial mode, the mode sliders 35 are in the initial position. Accordingly, the rotary lever 51 is held in the first position by the biasing portion 44 of the control cam 45 and the loading blocks 61 are held in the stand-by position. The side brake lever 18 is held in the brake release position. Therefore, the S side reel drive shaft assembly 51 can be rotated.

When the tape cassette is loaded on the R-DAT under this condition, the pinch roller 55, movable guide 56 and the loading posts 63 are relatively positioned in a tape pulling recess 73 provided on the front side of a cassette case of the tape cassette 14 and a supply side tape reel 74A (hereinafter referred to "S reel") which the tape cassette 14 has and a take-up side tape reel 74B (hereinafter referred to as "T reel") are engaged with the reel engaging shafts 7 of the two reel drive shaft assemblies 5A and 5B, respectively. When a tape loading is instructed under this condition, the mode slider 35 is moved to the stop time position and the loading arms 6 are extended to move the loading blocks 61 and the rotary lever 54 to the loading completion position and the third position, respectively.

A portion of the magnetic tape 75 which has been positioned along the front face of the tape pulling recess 73 is pulled out by a given amount from the S reel 74 by being pulled by the loading posts 63, the pinch roller 55 and the movable guide 56 which move rearward. The thus pulled out magnetic tape 75 is passed through a tape path represented by a small two dot and chain line in FIG. 2. In other words, after the magnetic tape 75 exits from the S reel 74A, it is wound around the left side fixed tape guide 12 and the loading post 63 in this order. After the magnetic tape is wound around the loading post 63, it is turned forward and wound around the outer periphery of the head drum 11 over a given winding angle and is turned rearward and then wound around the right side loading post 63. After the tape 75 is then turned forward again, it is wound around the right side fixed tape guide 12 and the movable guide 56 in this order and is taken up by the T reel. The tape 75 passes through such a path.

The position restriction of the S side brake lever 18 by the mode slider 35 is released simultaneously with the arrival of the mode slider 35 at the stop time position. The S side brake lever 18 is then moved to the brake position.

This condition is the stop mode. Fast running of the tape for fast feeding or rewinding is performed by rotating the reel drive shaft assemblies 5A or 5B after the electromagnetic actuator 29 is energized to move the brake levers 18 and 19 to the brake release position for releasing the brake on the reel drive shaft assemblies 5A and 5B. That is, when the fast feeding of the tape is performed, the T side reel drive shaft assembly 5B with which the T reel 74B is engaged is rotated at a high speed in a clockwise direction as viewed from an upper position. When rewinding of the tape is performed, the reel drive shaft assembly with which the S reel is engaged is rotated at a high speed in a counterclockwise direction as viewed from an upper position so that it is run at a high speed in such a direction and the magnetic tape 75 is pulled out from the T reel 74B and taken up by the S reel 74A.

When an instruction for switching such fast feeding mode or rewinding mode to the stop mode is issued, the rotation of the reel drive shaft assembly 5B or 5A is stopped and the electromagnetic actuator 29 is deenergized so that the brake levers 18 and 19 are moved to the braking position to brake the reel drive shaft assembly.

When an instruction for establish a play mode for recording or play back, the mode slider 35 in moved to the play time position. Simultaneously with the arrival of the mode slider 35 at the play time position, electromagnetic actuator 29 is energized to move the brake levers 18 and 29 to the brake release position. This causes the loading blocks 61 to be brought into a pressure contact with the catchers 72 and the rotary lever 54 is moved to the second position so that the pinch roller 55 is brought into a pressure contact with the capstan 15 so that the magnetic tape 75 is pinched therebetween. The magnetic tape 75 is run at a constant speed by the rotating capstan 15 and the rotating pinch roller 55 which is in a pressure contact therewith. The thus running magnetic tape is taken up by the T reel 74B or the S reel 74A. The rotary magnetic heads 11c scan the recording surface of the magnetic tape 75 so that recording of signals on and reproducing of the recorded signals from the magnetic tape 75 is performed.

When an instruction to switch the play mode to the stop mode is issued, the mode slider 35 is moved to the stop time position so that the pressure contact lever 66 is returned to the stand-by position and the rotary lever 54 is rotated in a counterclockwise direction to return to the third position. When an instruction to switch the stop mode to the initial mode is issued, the mode slider 35 is moved to the initial position so that the rotary lever 54 is returned to the first position and the loading arms 65 are retracted to return the loading blocks 61 to the stand-by position. At this time, the magnetic tape 75 which has been pulled out from the cassette tape 14 is rewound by the S reel 74.

As mentioned above, when the mode slider 35 is in the play time position, the loading blocks 61 are placed in pressue contact with the catchers 72 by the tension of the tension springs 71, and the pinch roller 55 is in a pressure contact with the tension of the tension spring 69 of the pinch roller 55.

Accordingly, when at least the play mode has been established, a reaction force by the pressure contact, that is, a leftward returning force is applied on the mode slider 35.

Leftward movement of the mode slider 35 by the thus applied returning force is prevented by a slider lock mechanism 76 as follows:

The slider lock mechanism 76 comprises the electromagnetic actuator 29, the brake release lever 25 and a lock lever 77 which are included in the brake mechanism 17.

Figure 7:
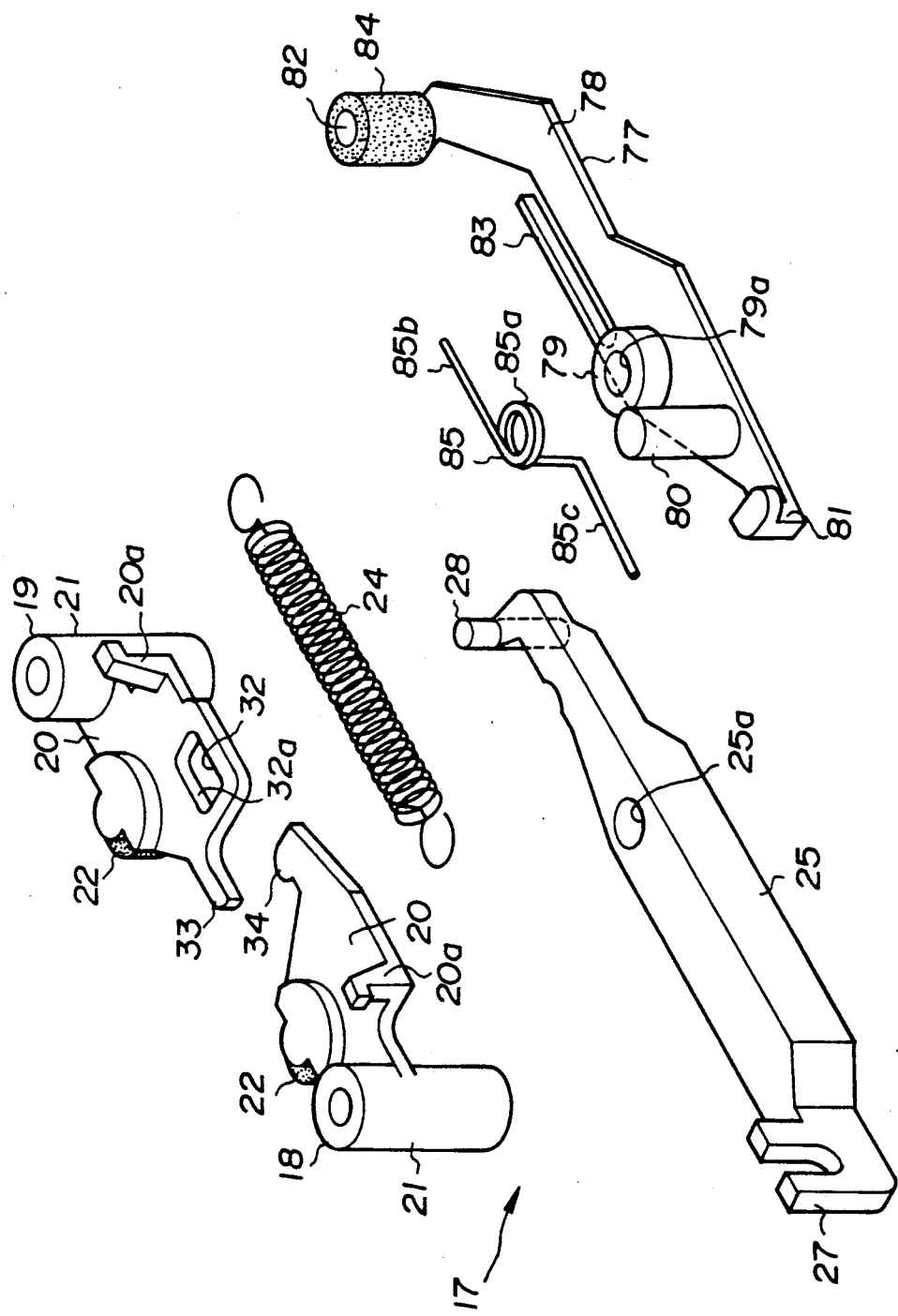
FIG. 7 is an enlarged and exploded perspective view showing a brake lever, a brake release lever and a lock lever, etc.
Figure 8:
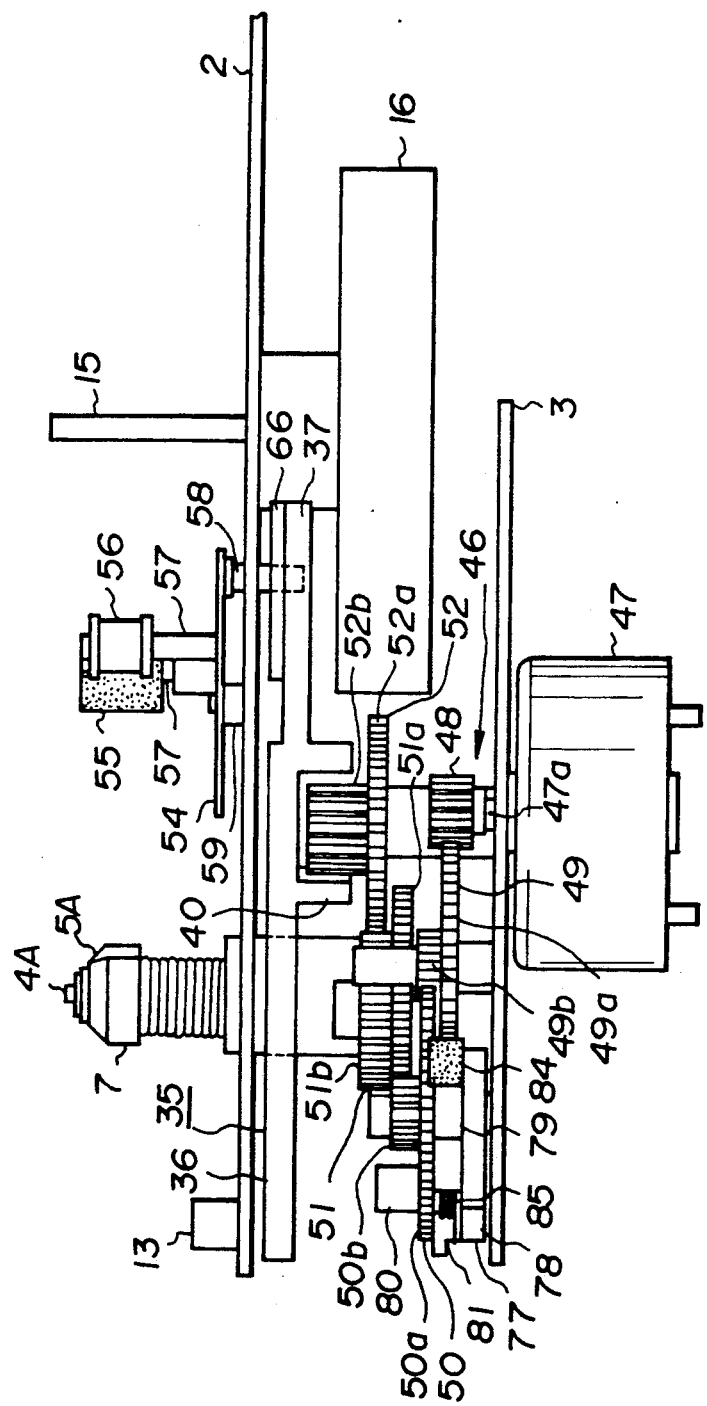
FIG. 8 is an elevational view showing a main part of the slider lock mechanism.

As best seen in FIG. 7, the lock lever 77 comprises a main portion which is generally elongated in right and left directions, having a slightly bent right half portion, a cylindrical boss 79 which is short in an axial direction thereof and projects from the upper surface of the rear end portion of a wide intermediate portion of the main portion 78 on a position offset in a left direction, a spring supporting pin 80 which stands erect on the upper surface of the main portion 78 on a position offset toward the left end thereof, a brake shoe supporting pin 82 standing erect on the right end of the main portion 78, and a leaf spring 78 which has a main portion extending in parallel with the intermediate portion of the rear side edge of the main portion 78 and a left end integral to the main portion 78. A cylindrical brake show 84 made of a rubber material is fitted on a brake shoe mounting pin 82 and the hole 79a of the boss 79 opens to the lower surface of the main portion 78.

A torsional spring 85 comprises a coil portion 85a which is fitted on the spring support pin 80 of the lock lever 77, an arm 85b which is biased on the front side thereof at the tip end thereof by the boss 79 and the other arm 85c which is biased on the front side at the intermediate thereof by a spring abutment 81.

A lever support shaft stands erect on the upper surface of the front end portion of the sub-chassis 3 on a position offset leftward from the gear support shaft 53 for supporting the second transmission gear 50 of the slider drive unit 46.

The lever support shaft 88 is inserted into the hole 79a of the boss 79 so that the lock lever 77 is rotatably supported by the lever support shaft 86. The tip end of the leaf spring 83 is in contact on the front side thereof with the lower end portion of the gear support shaft 53 which supports the second transmission gear 50 so that the lock lever 77 is biased to rotate in a clockwise direction as viewed from an upper position. The tip end of the other arm 85c of the torsional spring 85c is in contact on the front side thereof with the lower end of the biasing pin 28 of the brake release lever 25.

Figure 5:
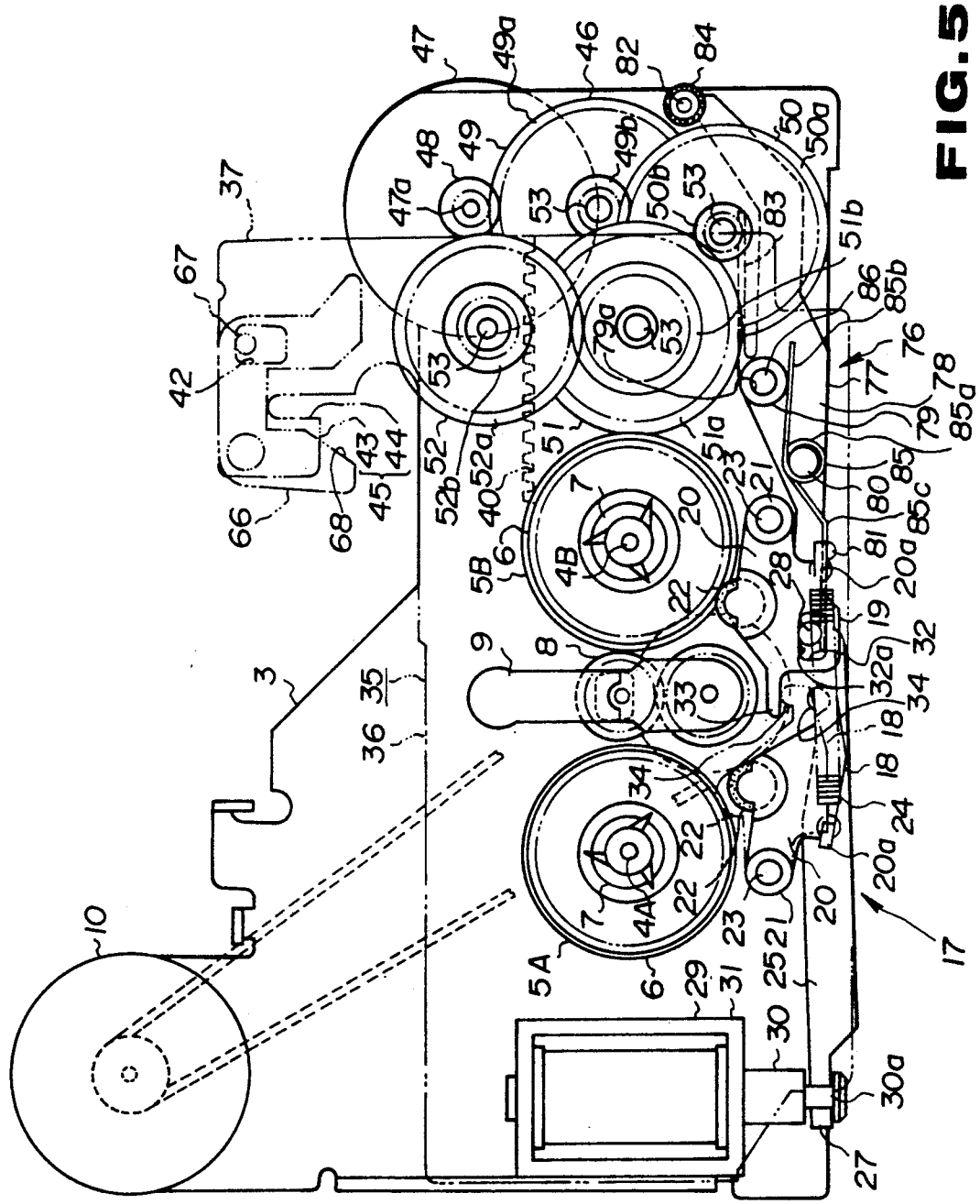
FIG. 5 is a plan view showing a condition of a tape which is not run in the portion below the main chassis.

Accordingly, restriction of the position of the lock lever 77 is performed by the biasing pin 28. When the other arm 85c of the torsional spring 85 is not separated forward from the spring abutment 81, the torsional spring 85 is integral with the lock lever 77. The position of the lock lever 77 in this condition is restricted by the leaf spring 83 to a position in which the tip end of the other arm 85c of the torsional spring 85 brings the biasing pin 28 into an abutment upon the read side edge 32a of the hole 32 of the T side brake lever 19 (refer to FIG. 5). When the lock lever 77 is in this position (hereinafter referred to as "unlocked position"), the brake shoe 84 is positioned in the vicinity of the larger gear 49a of the first transmission gear 49 of the slider drive unit 46 substantially on the right and front side thereof.

As mentioned above, the electromagnetic actuator 29 is energized when the magnetic tape is run from the stop mode or when the mode slider 35 reaches the play time position to complete the establishment of the play mode. This causes the brake release lever 25 to be rotated in a clockwise direction to move the brake levers 18 and 19 to the brake release position. Accordingly, the brake release lever 25 is rotated in a clockwise direction when the magnetic tape 75 begins to run from the condition that the mode slider 35 is in the stop time position or when the mode slider 35 reaches the play time position so that the pinch roller 55 is brought into a pressure contact with the capstan 15.

When the brake release lever 25 is rotated in a clockwise direction, the bias pin 28 will bias the tip end of the other arm 85c of the torsional spring 85 forward. The lock lever 77 is thus rotated in a counterclockwise direction against the biasing force of the leaf spring 83. Accordingly, the lock lever 77 is moved to a position in which the brake shoe 84 is brought into a pressure contact with the larger gear of the first transmission gear 49 (hereinafter referred to as "locked position") as shown in FIG. 11.

At this time, the brake release lever 25 is slightly rotated in a clockwise direction after the brake shoe 84 is brought into a pressure contact with the first transmission gear 49 to prevent the lock lever 77 from further rotation in a counterclockwise direction.

Figure 11:
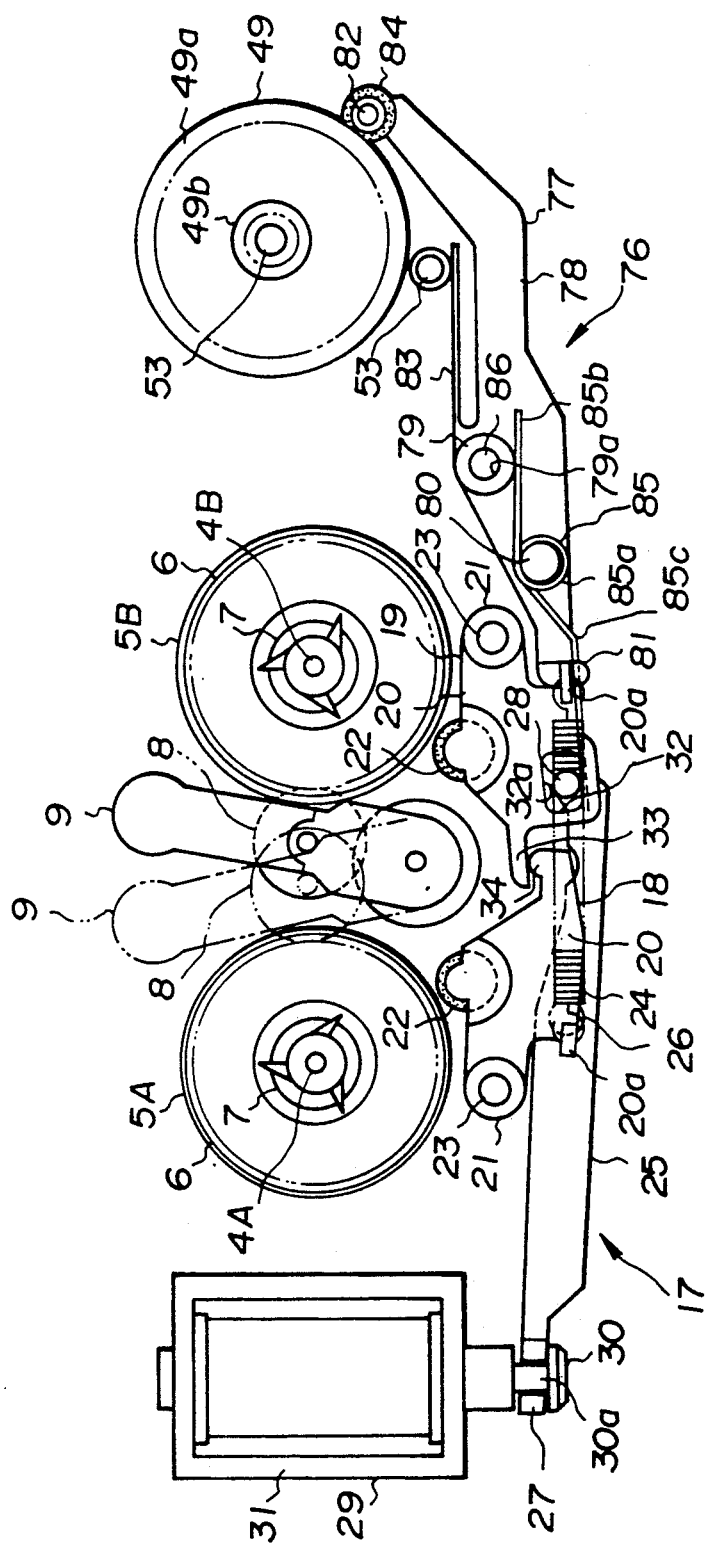
FIG. 11 is a plan view of the main part when the tape is run.

Accordingly, when the clockwise rotation of the brake release lever 25 is stopped, the other arm 85c of the torsional spring 85 is slightly separated forward from the spring abutment 81 of the lock lever 77 (refer to FIG. 11). Since a substantially forward force is applied on the spring support pin 80 fitted on the coiled portion 85a of the torsion spring 85, a force is applied to rotate the lock lever 77 in a counterclockwise direction so that the brake shoe 84 is brought into a pressure contact with the first transmission gear 49 to prevent the transmission gear 49 from rotating.

Since this prevents the transmission system of the slider drive unit 46 from rotating, the position of the rack 40 of the mode slider 35 is fixed. The mode slider 35 is locked in the position of interest, that is, the stop time position or play time position. Locking in the play time position is performed against the returning force.

Since the mode slider 35 is locked in such a manner, the mode slider is stably held in the loading completion position in which the loading blocks 61 are brought into an abutment on the catchers 72 when fast feeding and rewinding of the tape is performed. When the establishment of the play mode is completed, a condition of the pressure contact of the pinch roller 55 with the capstan 15 is stably held.

Locking of the mode slider 35 is released when an instruction to release the mode in which fast feeding or rewinding of the tape is performed is issued, when an instruction to release the play mode is issued, or when a power interruption occurs in these modes.

That is, at this time, power supply to the electromagnetic actuator 29 is interrupted, the electromagnetic actuator 29 is deenergized to release the biasing upon the lock lever 77, and the brake release lever 25 is released. The lock lever 77 is thus returned to the unlocked position by the biasing force of the leaf spring 83. When the mode slider 35 has been on the play time position, it is returned to the stop time position by the biasing force, that is, to a position such that the biasing forces by the tension spring 69 and 71 become zero.

If a power interruption occurs, pressure contact of the pinch roller 55 with the capstan and pressure contact of the loading blocks 61 with the catchers 72 are automatically released so that damage the to the components of the mechanism and the magnetic tape 75 due to pressure contact for an extended period of time is prevented.

What is claimed is:

1. A slider lock mechanism for setting the modes of a tape player, comprising:
   a chassis;
   slider means slidable along the chassis for establishing a plurality of operation modes depending upon positions set by the slider means;
   biasing means for biasing said slider means toward a first position;
   a motor;
   a plurality of rotary gears connected to the motor;
   slider driver means for converting a driving force of the motor into a moving force of said slider means via the plurality of rotary gears;
   electromagnetic actuating means; and
   braking means for locking said slider means in a second position against the biasing force of said biasing means by braking at least one of said plurality of rotary gears by energization of said electromagnetic actuator means.

2. A slider lock mechanism for setting the modes of a tape player as defined in claim 1 in which said slider means comprises:
   loading drive means for driving tape loading means which pulls a magnetic tape used in a cassette for winding the tape around magnetic recording and-/or reproducing head means; and
   pinch lever drive means for driving pinch lever means which supports a pinch roller which is in a pressure contact with a capstan via the magnetic tape, said slider means being slidable substantially in parallel with a straight line connecting the centers of a pair of reel drive shaft assemblies.

3. A slider lock mechanism for setting the modes of a tape player as defined in claim 2 in which said biasing means includes a first spring member for bringing the pinch roller into a pressure contact with the capstan when the slider means is set in the second position.

4. A slider lock mechanism for setting the modes of a tape player as defined in claim 2 in which said pinch lever drive means comprises
   a rotatable pressure contact lever for driving said pinch lever means in response to the movement of said slider means; and
   a second spring member disposed between said slider means and said pressure contact lever for bringing said pinch roller into a pressure contact with a capstan.

5. A slider lock mechanism for setting the modes of a tape player as defined in claim 2 in which said loading means comprises
   a slidable rack member for driving said loading drive means in response to the movement of said drive means; and
   first spring member disposed between said slider means and said rack means for moving the tape loading means relative to a catcher.

6. A slider lock mechanism for setting the modes of a tape player as defined in claim 5 in which said biasing means includes a second spring member for bringing a tape loading block into a pressure contact with the catcher when said slider means is set on said second position.

7. A slider lock mechanism for setting the modes of a tape player as defined in claim 1 in which said slider means is set in at least an initial position, said first position including a stop position and said second position including a recording or playback position.

8. A slider lock mechanism for setting the modes of a tape player as defined in claim 1 in which said tape loading means is driven by said loading drive means while said slider means moves between said initial and first positions.

9. A slider lock mechanism for setting the modes of a tape player as defined in claim 1 in which said braking means includes
   brake lever means which can abut a reel drive shaft assembly;
   brake biasing means for biasing said brake lever means to normally bring said brake lever means into abutment with said reel drive shaft assembly; and
   brake release lever means for moving said brake lever means away from said reel drive shaft assembly against said brake biasing means, whereby said electromagnetic actuator is energized to drive said brake release lever means to separate from said reel drive shaft assembly.

10. A slider lock mechanism for setting the modes of a tape player as defined in claim 1 in which said braking means includes
    first brake lever means which can abut one of said plurality of gears;
    brake biasing means for biasing said first brake lever means in such a direction as normally to separate said first brake lever means from said one of said plurality of gears; and
    a second brake lever means to engage and move the first brake lever means against said brake biasing means for bringing the first brake lever means into abutment with said one of said gears, whereby said electromagnetic actuator is energized to drive said second brake lever means for bringing the first brake lever means into abutment with said one of said gears.

11. A slider lock mechanism for setting the modes of a tape player as defined in claim 10 in which said second brake lever means comprises brake release lever means.

* * * * *